United States Patent [19]
Schöder

[11] Patent Number: 5,979,621
[45] Date of Patent: Nov. 9, 1999

[54] BRIDGE COUPLING FOR A HYDRODYNAMIC TORQUE CONVERTER HAVING A FRICTION LINING WITH CAVITIES

[75] Inventor: Bernd Schöder, Münnerstadt, Germany

[73] Assignee: Mannesmann Sachs AG, Schweinfurt, Germany

[21] Appl. No.: 09/056,375

[22] Filed: Apr. 7, 1998

[30] Foreign Application Priority Data

Apr. 9, 1997 [DE] Germany ............................ 197 14 563

[51] Int. Cl.[6] ..................................................... F16H 45/02
[52] U.S. Cl. .................. 192/3.29; 192/70.12; 192/70.14; 192/113.36
[58] Field of Search .................................. 192/3.28, 3.29, 192/3.3, 70.12, 70.14, 107 R, 113.36

[56] References Cited

U.S. PATENT DOCUMENTS

| | | | |
|---|---|---|---|
| 5,209,330 | 5/1993 | Macdonald | 192/3.29 |
| 5,566,802 | 10/1996 | Kirkwood | 192/3.29 |
| 5,660,259 | 8/1997 | Peng et al. | 192/113.36 |
| 5,669,474 | 9/1997 | Dehrmann et al. | 192/3.29 |
| 5,738,198 | 4/1998 | Walth et al. | 192/113.36 |
| 5,782,327 | 7/1998 | Otto et al. | 192/3.29 |

FOREIGN PATENT DOCUMENTS

| | | |
|---|---|---|
| 0 758 722 A2 | 2/1997 | European Pat. Off. . |
| 2 490 756 | 3/1982 | France ............................ 192/113.36 |
| 41 21 586 A1 | 1/1993 | Germany . |
| 44 32 624 C1 | 4/1996 | Germany . |
| 196 20 698 A1 | 9/1997 | Germany . |
| 61-31722 | 2/1986 | Japan . |
| 3-28523 | 2/1991 | Japan . |
| 7-208577 | 8/1995 | Japan . |

Primary Examiner—Richard M. Lorence
Attorney, Agent, or Firm—Cohen, Pontani, Lieberman & Pavane

[57] ABSTRACT

A bridge coupling on a hydrodynamic converter comprises a piston deflectable in the axial direction and connectable via at least one friction lining to the converter housing. A cavity is provided in the friction lining for the passage of hydraulic fluid from the converter's hydraulic fluid circuit. The cavity, in a transition area to the friction surface of the friction lining includes a stamped region to create an edge-free transition.

3 Claims, 3 Drawing Sheets

BRIDGE COUPLING FOR A HYDRODYNAMIC TORQUE CONVERTER HAVING A FRICTION LINING WITH CAVITIES

BACKGROUND OF THE INVENTION

1. Field of the Invention

The invention relates to a bridge coupling for a hydrodynamic torque converter which provides a friction coupling between the impeller and the turbine of the hydrodynamic torque converter.

2. Description of the Related Art

Germian reference DE 44 32 624 A1 discloses a prior art bridge coupling on a hydrodynamic torque converter which comprises an axially deflectable piston and is connectable via friction linings to the converter housing. At least one cavity is provided on the friction lining for the passage of hydraulic fluid from the converter hydraulic circuit.

Cavities of this type may be produced in the friction lining by the removal of friction material from the locations where cavities are planned. The friction material may be removed by a mechanical, thermal or chemical process to the desired depth, even to a depth that corresponds to the thickness of the friction lining. A template which leaves only those locations where cavities are desired uncovered is placed on the friction surface of a friction lining for this removal purpose. The uncovered locations are then subjected to the mechanical, physical or chemical process to remove material. In this type of material removal to create cavities, material remnants are left in the transition area of the cavities. When the piston is disengaged and the friction lining is thus separated from the converter housing, the material remnants may still frictionally contact a friction surface, such as the connector housing, and thereby produce an undesired drag, moment. This reduces the efficiency of the converter in an undesired manner. Moreover, frictional heat is created.

Cavities of this type may also be produced by pure stamping in the friction lining. Although this method creates no material remnants that result in unwanted drag moment, the depth of the cavities is limited to a fraction of the friction lining thickness. The cavities can therefore allow only a low volume flow of coriveiter fluid, which limits the desired cooling effect.

SUMMARY OF THE INVENTION

The object of the invention is to provide a friction lining of a bridge coupling for a hydrodynamic convener that includes cavities of greater depth such that a drag moment is prevented when a piston which activates the friction linings is disengaged.

This object is attained in accordance with the invention wherein each cavity has a stamped region in a transition area between the cavity and the friction surface of the friction lining which creates an edge free transition from the cavity to the friction surface of the friction lining. According to the invention, a tool embodied as a template is placed on the friction lining to produce cavities and covers all those locations where no cavities are to be created, so that the only locations remaining uncovered are those meant to undergo a material-removing process. The tool may simultaneously be embodied as a stamping tool that subjects the edge areas of the locations not covered by the template to material compaction by means of stamping. The object of the invention is thus achieved simply by the placement of the template needed to remove material from given locations on the friction lining. That is, no additional work step is needed to produce the stamped region. The material-removing process is then performed to remove material from the given locations to a predetermined depth; it is even possible to remove material down to the base of the friction lining (to the carrier layer) and thus to achieve maximum depth. It is clear that the openings in the template for producing the cavities are narrower than the areas where the projections needed to create the stamped region are arranged.

As a result, the stamped regions in the friction lining are not removed when the material-removing process is carried out.

Of course, the stamped regions may also be created by material compaction either before or after the material-removing process. However, in addition to the added complexity of performing an extra production step, there is also the problem that the stamping tool may not exactly match the openings provided in the template for the material-removing process, which may cause tolerance problems.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is described in areater detail in reference to an example. In the drawings.

DETAILED DESCRIPTION OF THE PRESENTLY PREFERRED EMBODIMENTS

Figure 1:
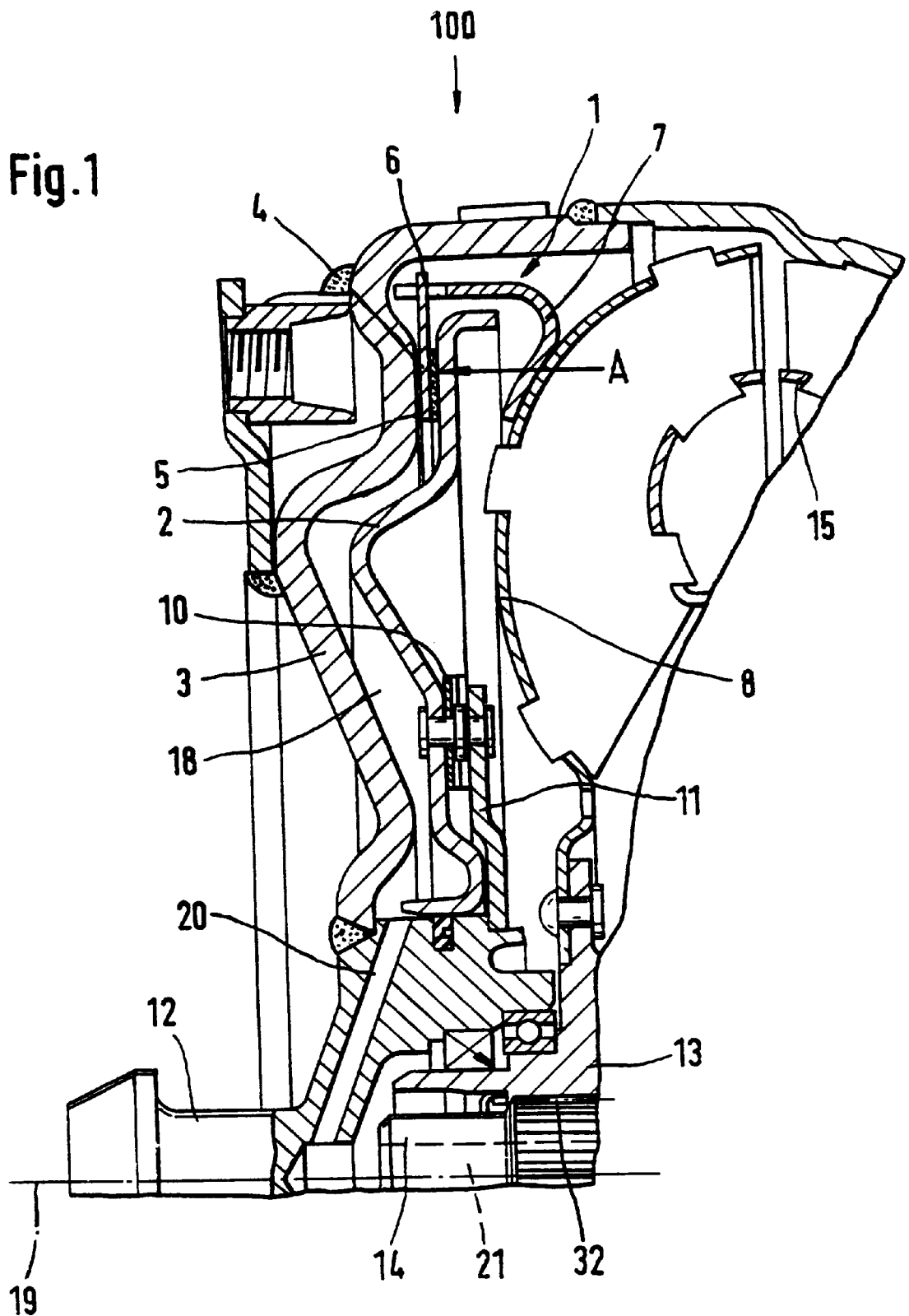
FIG. 1 is a longitudinal sectional view of a hydrodynamic torque converter showing the upper half of a bridge coupling with two friction linings.

FIG. 1 shows a section of a hydrodynamic torque converter 100 having a bridge coupling 1 where first and second friction linings 4, 5 are provided for transmitting a torque from a converter housing 3 and from a piston 2 of the bridge coupling to an output shaft 14. The bridge coupling 1 (also known as a lockup clutch) provides a friction coupling between the impeller and turbine of the torque converter to avoid efficiency losses associated with slip under certain conditions. FIG. 1 does not attempt to depict or describe the hydrodynamic torque converter 100 as a whole, because torque converters of this type are known from the prior art such as German reference DE 41 21 586 A1, which in incorporated herein by reference.

Referring to FIG. 1, bridge coupling 1 includes axially movable piston 2. The radially outer area of piston 2, on the side facing the converter housing 3. has a flat surface, on which the first friction lining 4 rests. The second friction lining 5 rests against a flat surface of the converter housing 3. The first and second friction linings 4, 5 are connected to a lamella 6 which is positioned between the friction lining 4 and second friction lining 5 and which is held in rotation-proof but axially movable fashion on a lamella driving carrier 7. The lamella driving carrier is attached to a turbine wheel 8 of the hydrodynamic torque converter 100.

The radially inner area of piston 2 is connected via a spring 10 to a holder 11 which is caulked to a shoulder of a fixed journal 12 on the hydrodynamic torque converter 100. The piston 2 operates under the action of the hydraulic medium, such as oil, supplied through the hydraulic torque converter 100. The hydraulic medium normally urges the piston 2 toward the converter housing 3 via the friction lings 4 and 5 and the lamella 6 unless, by means of a reversal in the manner known from DE 41 21 586 A1, a chamber 18 between the converter housing 3 and the piston 2 is subjected to pressure higher than the pressure on the side of the piston 2 facing away from the converter housing 3. When the pressure acting on the piston 2 from chamber 18 is less than the pressure on the side of the piston 2 facing away from the converter housing 3, the piston 2 is in a friction-locking connection with the converter housing 3, so that a rotation of the converter housing 3 is transmitted, via the friction linings 4, 5 and the lamella 6 as well as the lamella driving carrier 7, to the turbine wheel 8 and then from the turbine wheel 8, via the turbine hub 13, to an output shaft 14, which is held in the turbine hub 13 in rotation-proof fashion via a toothing 32. By means of a reversal of relative pressure, the piston 2 can be separated from the lamella 6 and thus from the converter housing 3, so that the drive movement of the converter housing 3 is conducted with slip to the turbine wheel 8 via an impeller 15 and then transmitted from the turbine wheel 8 via the turbine hub 13 to the output shaft 14.

The piston 2 is embodied without a torsional vibration damper. Therefore, it may be necessary to control the pressure force of the piston 2 relative to the lamella 6 and the converter housing 3 in such a way that, if rotational impacts are conducted via the converter housing 3, slip occurs between the friction linings 4, 5 and the lamella 6. However, replacing the advantage of vibration damping with slip in the friction linings 4, 5 increases the cooling requirements of the converter components, such as the converter housing 3, lamella 6 and piston 2. For this reason, the invention requires that oil supplied through the hydrodynamic torque converter 100 be conducted from the radially outward side of the friction linings 4, 5 into cavities 17 (shown in FIG. 2). After flowing through the cavities 17, the oil exiting from the radially inner side of the friction linings 4, 5 is fed through the chamber 18 between the converter housing 3 and the piston 2 and through borings 20, which lead radially inward to the rotational axis 19. The oil then flows into the rotational center of the torque converter, where the oil can flow back through a longitudinal boring 21 in the output shaft 14 into an oil supply.

Figure 2:
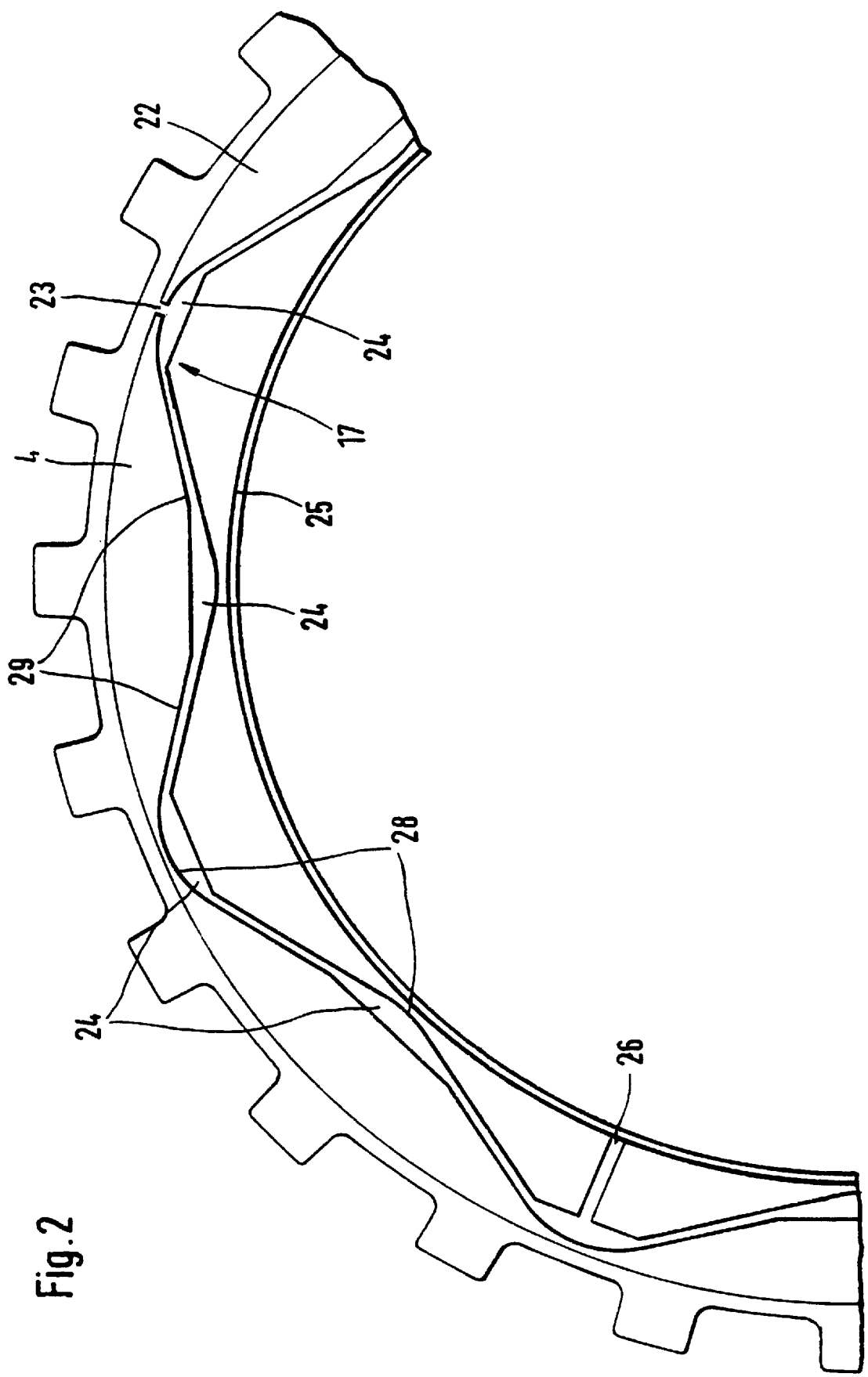
FIG. 2 shows the friction lining from view A in FIG. 1 showing the cavities therein.

To attain the optional possible cooling effect in the area of the friction linings 4, 5, the invention proposes a course for the cavities 17 like that shown, for example, in FIG. 2 with respect to the friction lining 4. The cavity 17 has an inflow 23 on a radially outer edge 22 of the friction lining 4, 5 which opens into a widening 24 of the cavity 17. Starting from the widening 24, the cavity 17 continues circumferentially in the form of channels 29, whereby this continuation also runs radially inward on both sides, until a radially inner edge 25 of the friction lining 4, 5 is almost reached. There, the cavity 17 again undergoes a widening 24. After this, the cavity continues to run circumferentially and radially outward, again with a narrowed channel cross-section, until near the outer edge 22, where another widening 24 is provided. The course of cavity 17 may alternate back and forth with a multiplicity of such channels between the outer edge 22 and the inner edge 25 of tie friction lining 4, 5 until reaching an outflow 26, which leads radially inward. Like the inflow 23, the outflow 26 is oriented normal to the tangent of the associated edge of the friction lining 4, 5.

Oil enters the cavities 17 through the inflow 23 and is conducted through the channels 29 so as to flow through practically the entire friction lining 4 from the radial outside to the radial inside. The plurality of reversals 28 that the oil must flow through to reach the outflow 26 ensure a greater heat exchange than would be achieved by oil flowing in a straight line. This heat exchange is further enhanced by the fact that, in the area of each reversal 28, the cavity 17 has a widening 24, which serves to hold a store of oil and thus amplifies the cooling effect at that point. Seen around the circumference of the friction lining 4. 5, a plurality of such cavities 17 are provided. As a result, the elements adjacent to the friction surfaces, such as the converter housing 3, the piston 2 and the lamella 6, are also adequately cooled without requiring a large covering cooling surface, which would result in excessively high area pressure on the friction linings.

Figure 3:
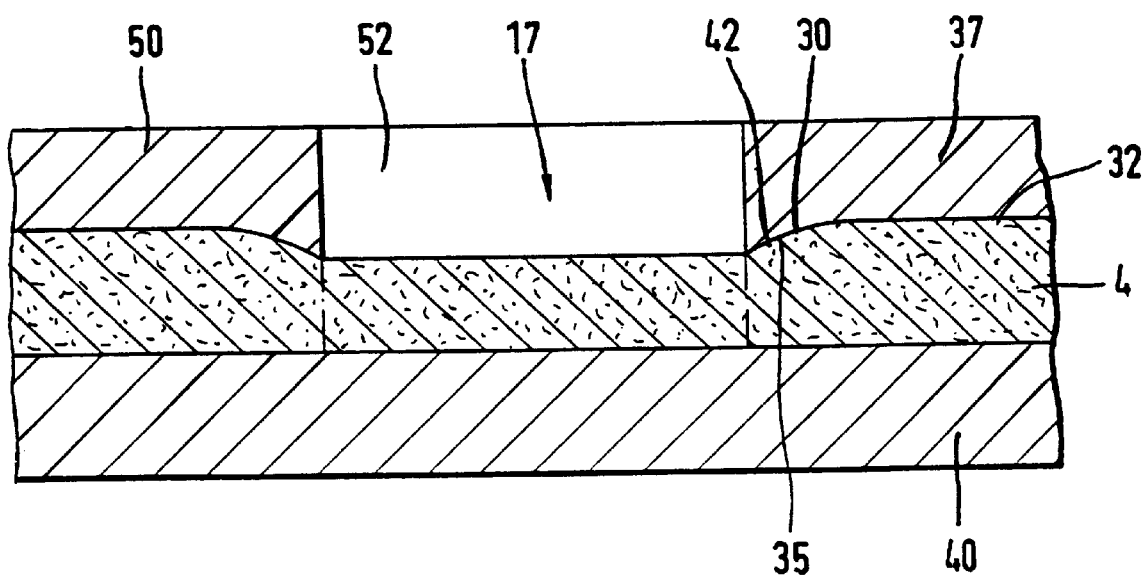
FIG. 3 is a partial view of a device for producing cavities with a stamped region in the edge area in a friction lining.

FIG. 3 shows a section through the friction inning 4 in the area of a cavity 17 to be created. In this embodiment, in contrast to FIG. 1, the friction lining 4 may be provided on either the lamella 6, the piston 2, or the converter housing 3. Therefore, general reference will be made here to a lining carrier 40. The friction lining 4 is stuck to the lining carrier 40. A stamping tool 37 is then placed on the friction surface 32 of the friction lining. In the area where the cavity 17 is to be created, the stamping tool 37 has an opening 52. In the area that will serve, in the finished friction lining, as the transition area 30 between the friction surface 32 and the cavity 17, the stamping tool 37 has a projection 42 directed toward the material carrier 40. Because of this projection 42, the friction lining 4 is more strongly compacted in the transition area 30 than in the remaining contact area of the stamping tool 37. As a result, material compaction occurs in the extension area of the projection 42, and a stamped region 35 is thereby created. The scamping tool 37 is then lifted from the friction lining 4 by means of an axial movement, and the material is removed by means of stamping, laser or radiation from the friction lining 4, so that the desired cavity 17 is created. Because of the previous material compaction in the transition area 30, no projections are created during the removal of material from the area of the cavity 17 in the direction of a possible counter friction surface, so that no abrasion occurs between the friction surface 32 of the friction lining 4 and the counter friction surface when the piston 2 is disengaged. This eliminates the drag moments which occur in the prior art friction linings.

Of course, tie removal of material from the friction lining 4 to produce the cavity 17 may also be carried out before the material compaction by the stamping tool 37 or simultaneously therewith. In particular, the latter application is of special advantage, because the tool needed for the removal of the material is equipped with the projections 42, so that the advantageous effect according to the invention can be attained without greater production technology expense. A stamping tool 37 of this type may comprise, for example, a template 50, which covers the friction lining 4 except for the areas where the cavities 17 are to be created and, at the same time, produces the stamped regions 35. The areas of the friction lining 4 which are not covered by template 50 are then removed by a mechanical, thermal or chemical process. For this purpose, the template 50 is equipped at those locations with openings 52 and has projections 42 adjacent to the edges of lie openings 52 on the side facing the friction lining 4, so that the stamped regions 35 according to the invention are produced simply by the placement of this template 50 on the friction lining 4.

The invention is not limited by the embodiments described above which are presented as examples only but can be modified in various ways within the scope of protection defined by the appended parent claims.

I claim:

1. A bridge coupling on a hydrodynamic torque converter, comprising:

an axially deflectable piston;

a friction lining positioned between said piston and a converter housing and having a cavity for the passage of hydraulic fluid from the hydrodynamic torque converter from the radially outer side of the friction lining to the radially inner side of the friction lining; and a stamped transition area between said cavity and a friction surface of the friction lining to create an edge-free transition between the cavity and the friction surface, said stamped transition area comprising a compacted region of said friction lining formed by a stamping tool and said cavity comprising a non-compacted region of said friction lining formed by removal of material from said friction lining.

2. The bridge coupling of claim 1, wherein said compacted region is formed by a template which covers the friction surface of the friction lining except for openings in the template located where said cavity is to be created, so that only said cavity is subjected to a material-removing process.

3. The bridge coupling of claim 1, wherein said compacted region is formed by a template comprising projections facing the friction lining for producing said stamped transition area.

* * * * *